US012689091B2

(12) United States Patent
Liu et al.

(10) Patent No.: US 12,689,091 B2
(45) Date of Patent: Jul. 21, 2026

(54) END COVER ASSEMBLY, BATTERY CELL, BATTERY, AND DEVICE AND METHOD FOR MANUFACTURING BATTERY CELL

(71) Applicant: CONTEMPORARY AMPEREX TECHNOLOGY (HONG KONG) LIMITED, Hong Kong (CN)

(72) Inventors: Yanyu Liu, Ningde City (CN); Shoujun Huang, Ningde City (CN); Xinxiang Chen, Ningde City (CN); Yulian Zheng, Ningde City (CN); Peng Wang, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 1031 days.

(21) Appl. No.: 17/847,185

(22) Filed: Jun. 23, 2022

(65) Prior Publication Data

US 2022/0384906 A1    Dec. 1, 2022

Related U.S. Application Data

(63) Continuation of application No. PCT/CN2021/097674, filed on Jun. 1, 2021.

(51) Int. Cl.
*H01M 50/358* (2021.01)
*H01M 10/0525* (2010.01)
(Continued)

(52) U.S. Cl.
CPC ..... *H01M 50/358* (2021.01); *H01M 10/0525* (2013.01); *H01M 10/0587* (2013.01); *H01M 50/186* (2021.01); *H01M 2220/20* (2013.01)

(58) Field of Classification Search
CPC ............. H01M 50/358; H01M 50/186; H01M 10/0525; H01M 10/0587; H01M 2220/20
See application file for complete search history.

(56) References Cited

U.S. PATENT DOCUMENTS

2007/0015046 A1* 1/2007 Kim .................... H01M 50/171
                                                                429/185
2012/0100404 A1* 4/2012 Lee ..................... H01M 50/171
                                                                429/82
(Continued)

FOREIGN PATENT DOCUMENTS

CN        103208597 A     7/2013
CN        108735949 A     11/2018
(Continued)

OTHER PUBLICATIONS

EPO machine generated English translation of CN 112234309 A (Year: 2021).*
(Continued)

*Primary Examiner* — Kimberly Wyluda
(74) *Attorney, Agent, or Firm* — XSENSUS LLP

(57) ABSTRACT

The application relates to an end cover assembly, a battery cell, a battery, and a device and method for manufacturing a battery cell. The end cover assembly is used for a battery cell, and includes a cover plate, the cover plate is provided with a pressure relief hole penetrating through the cover plate in a thickness direction, a breathable film, arranged opposite to the pressure relief hole and configured to exhaust gas inside the battery cell, a projection of the breathable film in the thickness direction does not overlap with a projection of the cover plate in the thickness direction; and a fixing member, configured to connect the cover plate to fix the breathable film. The application intends to solve the problem of a large space occupied by the breathable film.

21 Claims, 8 Drawing Sheets

(51) Int. Cl.
H01M 10/0587 (2010.01)
H01M 50/186 (2021.01)

(56) References Cited

U.S. PATENT DOCUMENTS

| | | | | | |
|---|---|---|---|---|---|
| 2021/0036285 A1* | 2/2021 | Huang | ................. | H01M 50/159 |
| 2022/0123417 A1* | 4/2022 | Huang | ................. | H01M 50/271 |

FOREIGN PATENT DOCUMENTS

| | | | | | |
|---|---|---|---|---|---|
| CN | 110379951 | A | | 10/2019 | |
| CN | 110391367 | A | | 10/2019 | |
| CN | 110400895 | A | | 11/2019 | |
| CN | 110429214 | A | | 11/2019 | |
| CN | 209880668 | U | * | 12/2019 | ......... H01M 50/271 |
| CN | 209981287 | U | | 1/2020 | |
| CN | 212182380 | U | | 12/2020 | |
| CN | 112234309 | A | | 1/2021 | |
| EP | 3046161 | A1 | * | 7/2016 | ......... H01M 50/394 |
| EP | 3 772 120 | A1 | | 2/2021 | |
| EP | 3 772 762 | A1 | | 2/2021 | |
| EP | 4 071 896 | A1 | | 10/2022 | |
| FR | 2564247 | A1 | | 11/1985 | |
| JP | 2017-1692968 | A | | 9/2017 | |
| WO | 2019/013433 | A1 | | 1/2019 | |

OTHER PUBLICATIONS

EPO machine generated English translation of EP-3046161-A1 (Year: 2016).*

Office Action issued Aug. 7, 2024 in European Patent Application No. 21912315.5.

Office Action issued Jun. 22, 2023 in Chinese Patent Application No. 202180007070.8, 9 pages. (with Concise Explanation of Relevance).

Extended European Search Report issued Apr. 28, 2023 in European Patent Application No. 21912315.5, 6 pages.

International Search Report issued Mar. 8, 2022 in International Application No. PCT/CN2021/097674, 4 pages.

* cited by examiner

1000

100

30

31

20

233

232

231

23

231

22

211

21

231                                                    B

E-E

F

END COVER ASSEMBLY, BATTERY CELL, BATTERY, AND DEVICE AND METHOD FOR MANUFACTURING BATTERY CELL

CROSS-REFERENCE TO RELATED APPLICATION

This application claims priority to and the benefit of PCT/CN2021/097674, filed Jun. 1, 2021, the entire content of which is incorporated herein by reference.

TECHNICAL FIELD

The application relates to the technical field of batteries, in particular to an end cover assembly, a battery cell, a battery and a device and method for manufacturing a battery cell.

BACKGROUND ART

Lithium ion batteries are commonly used in vehicles. Rechargeable lithium ion batteries feature the advantages of small size, high energy density, high power density, frequent recycling and long storage period.

The rechargeable battery generally includes a case, an end cover assembly and an electrode assembly, wherein the end cover assembly covers the case to provide a sealed space for the electrode assembly and electrolyte, and also has a breathable film configured to discharge gas inside the battery cell. In a general end cover assembly, limited by the structure of the end cover, the breathable film occupies a large space.

SUMMARY OF THE INVENTION

An embodiment of the application provides an end cover assembly, a battery cell, a battery, and a device and method for manufacturing a battery cell, aiming at solving the problem of a large space occupied by the breathable film.

In a first aspect, an embodiment of the application provides an end cover assembly, which is used for a battery cell, and includes a cover plate, provided with a pressure relief hole penetrating through the cover plate in a thickness direction, a breathable film, arranged opposite to the pressure relief hole and configured to exhaust gas inside the battery cell, a projection of the breathable film in the thickness direction does not overlap with a projection of the cover plate in the thickness direction, and a fixing member, configured to connect the cover plate to fix the breathable film.

The end cover assembly provided in an embodiment of the present application includes a cover plate, a breathable film, and a fixing member, the fixing member is configured to connect the cover plate and the breathable film; since the breathable film is arranged opposite to the pressure relief hole and a projection of the breathable film in a thickness direction does not overlap with a projection of the cover plate in the thickness direction, the breathable film does not completely cover the pressure relief hole, which reduces a radial dimension of the breathable film and a space occupied by the breathable film; as a result, a size of the end cover assembly and the battery cell to which the end cover assembly is applied is further reduced.

In some embodiments, the fixing member clamps the breathable film, so that the breathable film is fixed to the fixing member.

The end cover assembly provided in an embodiment of the present application achieves the fixing of the breathable film through a method that the fixing member clamps the fixing member, which is structurally simple, and does not allow the breathable film to be easily detached from the fixing member under the clamping action of the fixing member.

In some embodiments, the fixing member covers the periphery of the breathable film in a circumferential direction, allowing the fixing member to clamp the breathable film.

With the above arrangement, the end cover assembly provided in an embodiment of the application makes the overall structure of the breathable film fixed by the fixing member more compact.

In some embodiments, the fixing member has a through hole and a plug-in opening, the through hole is arranged opposite to the pressure relief hole, and the breathable film covers the through hole and at least partially extends into the fixing member through the plug-in opening.

The end cover assembly provided in an embodiment of the application includes a fixing member provided with a through hole and a plug-in opening, which facilitate installation and connection of the breathable film and the fixing member, and ensure that the projection of the breathable film on the cover plate in the thickness direction does not overlap with that of the cover plate in the thickness direction.

In some embodiments, the fixing member includes an enclosure, a first limiting part and a second limiting part, both the first limiting part and a second limiting part are arranged on an inner side wall of the enclosure and disposed along a circumferential direction, the first limiting part and the second limiting part and arranged at intervals in a thickness direction, the enclosure, the first limiting part and the second limiting part jointly define an accommodating space, and the breathable film is at least partially located in the accommodating space.

With the above arrangement, the end cover assembly provided in an embodiment of the application achieves a limitation of the degrees of freedom of the breathable film in a thickness direction of the cover plate, which prevents the breathable film from being detached from the fixing member in the thickness direction, and achieves the connection between the breathable film and the fixing member.

In some embodiments, the breathable film includes a body portion configured to exhaust gas inside the battery cell, and an edge portion connected to the body portion and at least partially extending into the accommodating space in a first direction perpendicular to the thickness direction.

For the end cover assembly provided in an embodiment of the application, the breathable film is of the above structures, which facilitates the connection with the fixing member, and can ensure a requirement of exhausting gas inside the battery cell.

In some embodiments, the edge portion abuts against at least one of the first limiting part and the second limiting part to limit a movement of the breathable film relative to the connecting member in a thickness direction.

With the above arrangement, the end cover assembly provided in an embodiment of the application can ensure a reliable connection between the breathable film and the fixing member.

In some embodiments, the edge portion is stacked and connected to one of the first limiting part and the second limiting part.

With the above arrangement, the end cover assembly provided in an embodiment of the application achieves a limitation of a relative position of the edge portion relative to the first limiting part or the second limiting part, and of the degrees of freedom of movement of the edge portion, thereby avoiding a movement of the breathable film relative to the fixing member and ensuring a reliable connection between the breathable film and the fixing member.

In some embodiments, the breathable film is integrally formed with one of the first limiting part and the second limiting part.

With the above arrangement, the end cover assembly provided in an embodiment of the application can ensure a connection strength between the breathable film and the fixing member, thereby avoiding a relative displacement between the two.

In some embodiments, one of the first limiting part and the second limiting part is connected to the enclosure and the other one of the first limiting part and second limiting part abuts against the enclosure, the fixing member further includes a connection body which penetrates through and connects to the first limiting part and the breathable film in a thickness direction.

With the above arrangement, the end cover assembly provided in an embodiment of the application can achieve a connection between the breathable film and the fixing member by a connecting member, thus ensuring a reliable connection between the two.

In some embodiments, the edge portion includes intersecting disposed a first extending body and a second extending body, the first extending body extends along a first direction and the second extending body extends along a thickness direction, and one of the first limiting part and the second limiting part fits with the second extending body to limit a movement of the breathable film in the first direction.

Since the end cover assembly provided in an embodiment of the application achieves a limitation of the degrees of freedom of movement of the breathable film in a thickness direction by at least one of the first limiting part and the second limiting part, the breathable film can be restricted from moving relative to the fixing member in the thickness direction and in the first direction perpendicular to the thickness direction, thereby ensuring a reliable connection between the two, and further a safety performance of the single cell.

In some embodiments, one of the first limiting part and the second limiting part is provided with a limiting hole which penetrates through one of the first limiting part and the second limiting part along a thickness direction; the first extending body abuts against one of the first limiting part and the second limiting part, and the second extending body at least partially extends into the limiting hole.

For the end cover assembly provided in an embodiment of the application, the first extending body abuts against one of the first limiting part and the second limiting part, and at least partially extends into the limiting hole to limit the breathable film in the thickness direction and in the first direction perpendicular to the thickness direction, which prevents the breathable film from falling out and moving relative to the fixing member due to high temperature or gas shock, ensuring a reliable connection between the two, and reducing an injection melt flow resistance of the breathable film.

In some embodiments, one of the first limiting part and the second limiting part includes intersecting disposed a first mating body and a second mating body, arranged with an interval from the other of the first limiting part and the second limiting part in a thickness direction and connected to the enclosure, the second mating body is connected to one end of the first mating body away from the enclosure and at least partially extends along a thickness direction, the first mating body abuts against the breathable film in the thickness direction, and the breathable film is at least partially clamped between the enclosure and the second mating body in a first direction.

With the above arrangement, the end cover assembly provided in an embodiment of the present application can provide a position limitation of the breathable film through the first limiting part and the first mating body in a thickness direction, and provide a position limitation of the breathable film through the enclosure and the second mating body in a first direction intersecting with the thickness direction, thereby limiting a relative position between the breathable film and the fixing member, and ensuring a reliable connection between the two.

In some embodiments, the second extending body is a structure with a variable section in a thickness direction, one of the first limiting part and the second limiting part further includes a third mating body connected to the second mating body and extending along a first direction to the side where the enclosure is located, and the second extending body is at least partially clamped between the first mating body and the third mating body in a thickness direction.

Through providing the third mating body and clamping at least part of the second extending body between the first mating body and the third mating body, the end cover assembly provided in an embodiment of the application can further limit the position of the breathable film in a thickness direction, so as to prevent the breathable film falling out due to high temperature or gas shock, and ensure a safety performance of the end cover assembly.

In some embodiments, an orthogonal projection of the fixing member in a thickness direction is located in the pressure relief hole, and the fixing member at least partially extends into the pressure relief hole and is in hermetical connection with the cover plate.

In some embodiments, the cover plate has a first end face and a second end face arranged opposite to each other in a thickness direction, and the fixing member does not exceed at least one of the first end face and the second end face in a thickness direction.

In some embodiments, the end cover assembly further includes a sealing member for sealing a connection region between the fixing member and the breathable film.

Through providing a sealing member, the end cover assembly provided in an embodiment of the application can ensure a sealing performance of the breathable film and the fixing member, and prevent pollutants such as water vapor from entering through the gap between the breathable film and the fixing member, thereby ensuring safety of the battery cell.

In some embodiments, the sealing member and the breathable film are stacked in the thickness direction, and the sealing member is clamped and fixed between the fixing member and the breathable film.

With the above arrangement, the end cover assembly provided in an embodiment of the application can increase a contact area between the sealing member and the breathable film, and ensure the stability of a relative position of the sealing member between the breathable film and the fixing member, thereby ensuring a reliability of sealing.

In some embodiments, the sealing member includes intersecting disposed a first sealing portion and a second sealing portion, the first sealing portion is arranged on an inner side wall of the fixing member along a circumferential direction, and the second sealing portion extends into the fixing member in a first direction and abuts against the fixing member and the breathable film, the first direction is perpendicular to the thickness direction.

With the above arrangement, the end cover assembly provided in an embodiment of the application allows the sealing member to provide sealing in a thickness direction and a first direction, thereby ensuring the reliability of sealing.

In some embodiments, the breathable film is further actuated to release an internal pressure of the battery cell when the internal pressure or temperature reaches a threshold value.

With the above arrangement, the breathable film of the end cover assembly provided in an embodiment of the application can serve as a safety valve, thereby ensuring safety performance of the breathable film.

In some embodiments, a strength of the cover plate is greater than a strength of the breathable film, so that the breathable film ruptures prior to the cover plate when an internal pressure or temperature of the battery cell reaches a threshold value, so as to release the internal pressure of the battery cell.

In some embodiments, the breathable film includes a polymer material.

For the end cover assembly provided in an embodiment of the application, the breathable film includes polymer materials with air permeability and water proof, which allows gas generated inside the battery cell to be stably exhausted, and prevents external moisture from infiltrating.

In another aspect, according to an embodiment of the application, a battery cell includes a case, which has an opening, an electrode assembly accommodated in the case, and the end cover assembly; the cover plate is configured to cover the opening, and the breathable film is configured to exhaust gas inside the battery cell.

In still another aspect, according to an embodiment of the application, a battery includes a box and the battery cell accommodated in the box.

In yet another aspect, an embodiment of the application provides an electric device, which includes the battery cell.

In yet another aspect, according to an embodiment of the application, a method for manufacturing a battery cell includes: providing a case, which has an opening; providing an electrode assembly; providing an end cover assembly, which includes a cover plate, provided with a pressure relief hole penetrating through the cover plate in a thickness direction, a breathable film, arranged opposite to the pressure relief hole, a projection of the breathable film in the thickness direction does not overlap with that of the cover plate in the thickness direction, and a fixing member, configured to connect the cover plate to fix the breathable film; accommodating the electrode assembly in the case; and covering the opening with the cover plate to form a battery cell; wherein the breathable film is configured to exhaust the gas inside the battery cell.

In yet another aspect, according to an embodiment of the application, a device for manufacturing a battery cell includes: a first providing device, configured to provide a case, the case has an inner cavity and an opening; a second providing device, configured to provide an electrode assembly; a third providing device, configured to provide an end cover assembly, which includes: a cover plate, provided with a pressure relief hole penetrating through the cover plate in a thickness direction, a breathable film, arranged opposite to the pressure relief hole, a projection of the breathable film in the thickness direction does not overlap with a projection of the cover plate in the thickness direction, and a fixing member, configured to connect the cover plate to fix the breathable film; and an assembly device, configured to accommodate the electrode assembly in the case and seal the opening with the cover plate, wherein the breathable film is configured to exhaust gas inside the battery cell.

BRIEF DESCRIPTION OF THE DRAWINGS

In order to describe the technical solutions in the embodiments of the application more clearly, the accompanying drawings required for describing the embodiments are briefly described below. Obviously, the accompanying drawings in the following description show merely some embodiments of the present disclosure, and a person of ordinary skill in the art would also be able to derive other accompanying drawings from these accompanying drawings without creative efforts.

In the drawings, the same components are marked with the same reference numerals. The drawings are not drawn to actual scale.

Figure 1:
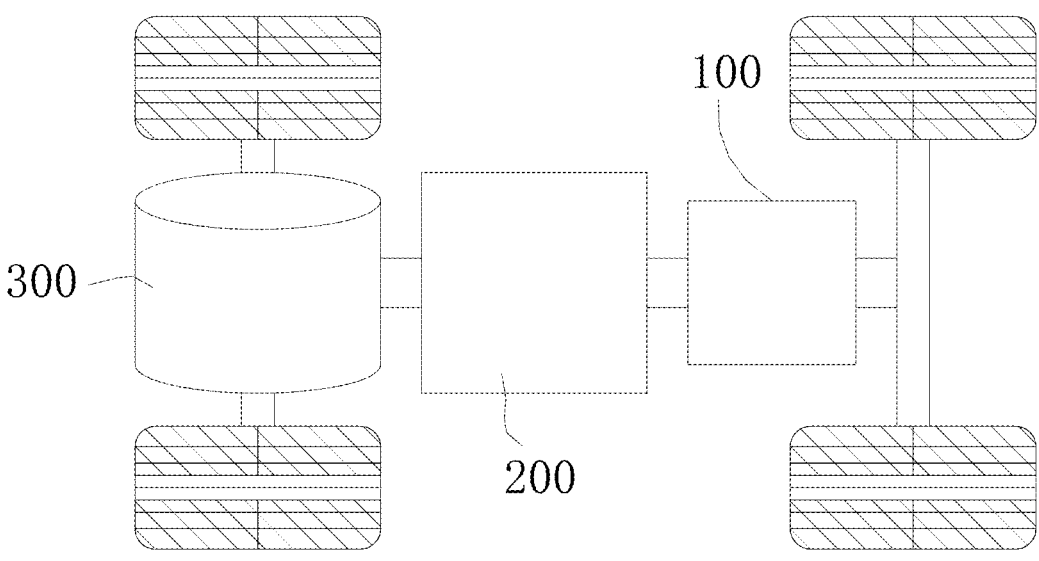
FIG. 1 is a structural schematic diagram of a vehicle provided in some embodiments of the application.

Wherein, the indications of the reference numerals and letters are as follows: 10—box; 11—first part; 12—second part; 13—sealed space; 20—battery cell; 21—case; 211—opening; 22—electrode assembly; 23—end cover assembly; 231—cover plate; 2311—pressure relief hole; 2312—first end face; 2313—second end face; 232—breathable film; 2321—body portion; 2322—edge portion; 2322a—first extending body; 2322b—second extending body; 233—fixing member; 233a—third end face; 233b—fourth end face; 233c—through hole; 233d—plug-in opening; 2331—enclosure; 2332—first limiting part; 2333—second limiting part; 2333a—limiting hole; 2333b—first mating body; 2333c—second mating body; 2333d—third mating body; 2334—accommodating space; 2335—connection body; 2336—seal ring; 2337—buckling body; 234—sealing member; 2341—first sealing portion; 2342—second sealing portion; 2343—third sealing portion; 235—electrode terminal; 30—battery module; 31—bus component; 100—battery; 200—controller; 300—motor; 1000—vehicle; 2000—manufacturing device; 2100—first providing device; 2200—second providing device; 2300—third providing device; 2400—assembly device; X—thickness direction; Y—first direction.

Specific Embodiments

To make the objectives, technical solutions, and advantages of the embodiments of the application clearer, the following will clearly describe the technical solutions in the embodiments of the application with reference to the accompanying drawings in the embodiments of the application. Apparently, the described embodiments are some rather than all of the embodiments of the application. Based on the embodiments of the application, all other embodiments obtained by those of ordinary skill in the art without making creative efforts fall within the scope of protection of the application.

Unless otherwise defined, all technical and scientific terms used in the application have the same meanings as those commonly understood by those who belong to the technical field of the present application. In the application, the terms used in the specification of the application are merely for the purpose of describing specific embodiments, and are not intended to limit the application. The terms "including" and "having" and any variations thereof in the specification and claims of the application and the above accompanying drawings are intended to cover non-exclusive inclusion. The terms "first", "second", etc. in the specification and claims of the application or the above accompanying drawings are used to distinguish different objects, but not to describe a specific order or primary and secondary relationship.

Reference to an "embodiment" in the application means that a specific feature, structure or characteristic described in conjunction with an embodiment may be included in at least one embodiment of the application. The appearance of this phrase in various places in the specification does not necessarily mean the same embodiment, nor is it an independent or alternative embodiment mutually exclusive with other embodiments.

In the description of the application, it should be noted that, unless otherwise explicitly specified and defined, the terms "mounting", "connecting", "connection" and "attachment" should be understood in a broad sense, for example, they may be a fixed connection, a detachable connection, or an integrated connection; and may be a direct connection, or an indirect connection via an intermediate medium, or communication inside two elements. For those of ordinary skill in the art, the specific meanings of the above terms in the application could be understood according to specific circumstances.

In the embodiments of the application, the same reference numerals refer to same components, and for the sake of brevity, detailed descriptions of the same components are omitted in different embodiments. It should be understood that a thickness, a length, a width and other dimensions of various components and an overall thickness, length, width and other dimensions of an integrated device shown in the accompanying drawings in the embodiments of the application are merely exemplary, and should not constitute any limitation on the application. The term "plurality" in the application means two or more.

In the application, battery cells may include a lithium ion secondary battery, a lithium ion primary battery, a lithium-sulfur battery, a sodium lithium-ion battery, a sodium ion battery or a magnesium ion battery, etc., which is not limited by the embodiments of the application. The battery cell may be in cylindrical, flat, cuboid or other shapes, which is not limited by the embodiments of the application. Generally, the battery cells are divided into three types according to packaging manners: cylindrical battery cells, square battery cells and pouch battery cells, which are not limited by the embodiments of the application.

The battery mentioned in the embodiments of the application refers to a single physical module which includes one or a plurality of battery cells and therefore provides a higher voltage and capacity. For example, the battery mentioned in the application may include a battery module or a battery pack, etc. Generally, the battery includes a box for packaging one or a plurality of battery cells. The box may prevent liquid or other foreign matter from affecting charging or discharging of the battery cell.

The battery cell includes an electrode assembly and an electrolyte, where the electrode assembly is composed of a positive pole piece, a negative pole piece and a separator film. The battery cell works mainly depending on movement of metal ions between the positive pole piece and the negative pole piece. The positive pole piece includes a positive current collector and a positive active material layer, wherein the positive active material layer coats a surface of the positive current collector, a positive current collector not coated with the positive active material layer protrudes out of a positive current collector coated with the positive active material layer, and the positive current collector not coated with the positive active material layer serves as a positive tab. With a lithium ion battery as an example, a positive current collector may be made from aluminum, and the positive active material may be lithium cobalt oxide, lithium iron phosphate, ternary lithium or lithium manganate, etc. The negative pole piece includes a negative current collector and a negative active material layer, wherein the negative active material layer coats a surface of the negative current collector, a negative current collector not coated with the negative active material layer protrudes out of a negative current collector coated with the negative active material layer, and the negative current collector not coated with the negative active material layer serves as a negative tab. The negative current collector may be made from copper, and the negative active material may be carbon, silicon, etc. In order to guarantee fusing does not occur during large current flow, a plurality of positive tabs are stacked together, and a plurality of negative tabs are stacked together. The separator film may be made from polypropylene (PP), polyethylene (PE), etc. In addition, the electrode assembly may be in a winding structure or a laminated structure, which is not limited in the embodiments of the application.

The battery cell can also include a case and an end cover assembly which covers the case to provide a sealed space for the electrode assembly and electrolyte, and the electrode assembly is electrically connected to an electrode terminal of the end cover assembly, through which the electric energy of the electrode assembly can be led out of the case.

During use, the battery has side reactions that continuously produce gas due to multiple charge and discharge cycles, which causes a certain amount of air pressure inside the battery cell, resulting in the risk of deformation and structural strength failure of the battery unit. To ensure the structural strength, a thick case should be designed, which will affect the energy density of the battery cell. Therefore, a breathable film is provided on the cover plate of the end cover assembly, so as to realize slow permeation exhaust on the basis of explosion-proof function, thereby reducing the internal air pressure of the battery cell, reducing the thickness of the casing of the battery cell and improving the energy density.

The inventors found that, in terms of the general end cover assembly, the breathable film needs to cover the cover plate when connected to the cover plate, which meets the connection needs but has the corresponding shortcomings; specifically, on the premise of achieving the same breathable function, the breathable film will occupy a large space, and a connection position should be reserved on the cover plate which is connected to the breathable film in a stacked way, resulting in a large size of the end cover assembly and the battery cell to which the end cover assembly is applied.

In view of this, an embodiment of the application provides a technical solution, in which the breathable film is fixed to the cover plate by a fixing member, and is arranged opposite to the pressure relief hole, so that the projection of the breathable film in a thickness direction does not overlap with the projection of the cover plate in the thickness direction, which reduces the radial dimension of the breathable film and the space occupied by the breathable film; as a result, the material could be saved so that bringing a better economical efficiency.

The technical solution described in the embodiments of the application is applicable to a battery and an electric apparatus using the battery.

The electric apparatus may be a vehicle, a mobile phone, a portable device, a notebook computer, a ship, a spacecraft, an electric toy, an electric tool, etc. The vehicles may be fuel vehicles, gas vehicles or new energy vehicles, and the new energy vehicles may be battery electric vehicles, hybrid electric vehicles, extended-range vehicles, etc. The spacecrafts include airplanes, rockets, space shuttles, spaceships, etc. The electric toys include fixed or mobile electric toys, such as game machines, electric car toys, electric ship toys and electric airplane toys. The electric tools include metal cutting electric tools, electric grinding tools, electric assembling tools and electric tools for railways, such as electric drills, electric grinders, electric wrenches, electric screwdrivers, electric hammers, impact electric drills, concrete vibrators, electric planers, etc. The embodiments of the application do not make special restrictions on the above electric apparatuses.

In the following embodiments, the vehicle is taken as an example of the electric apparatus for the convenience of description.

Referring to FIG. 1, a vehicle 1000 is internally provided with a battery 100, which may be disposed at the bottom, head or rear of the vehicle 1000. The battery 100 can be used to power the vehicle 1000, for example, the battery 100 may be used as a power source for the operation of the vehicle 1000.

The vehicle 1000 may further include a controller 200 and a motor 300, wherein the controller 200 is used to control the battery 100 to power the motor 300, for example, to start, navigate and drive the vehicle 1000.

In some embodiments, the battery 100 can serve as an operating power source or a driving power source for the vehicle 1000, replacing or partly replacing fuel or natural gas to provide driving power for the vehicle 1000.

Figure 2:
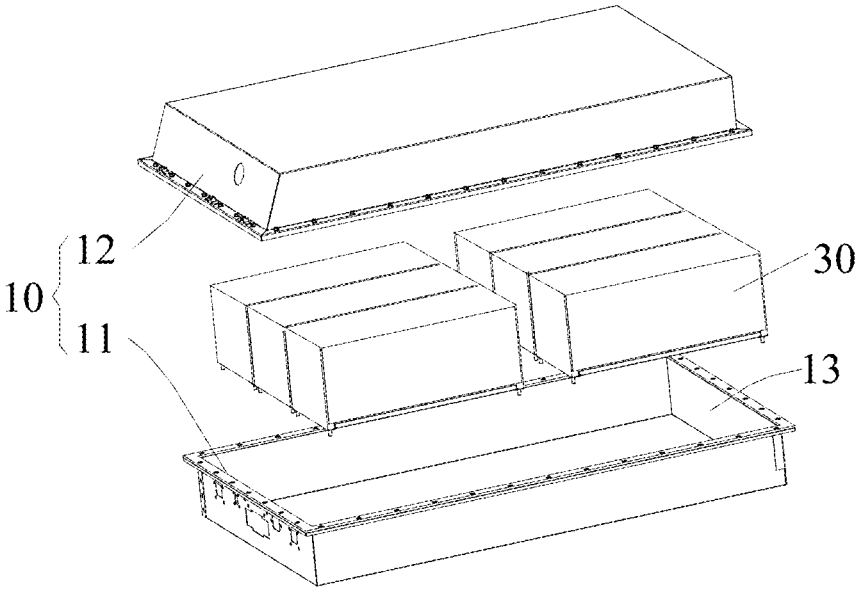
FIG. 2 is an exploded view of a battery provided in some embodiments of the application.

Referring to FIG. 2, the battery 100 includes a box 10 and a battery cell 20 accommodated therein. The box 10 is configured to provide a sealed space for the battery cell 20, and can be made into various shapes such as a cylinder, a cuboid, and the like. Exemplarily, the box 10 is a cuboid in FIG. 2.

In some embodiments, as shown in FIG. 2, the box 10 may include a first part 11 and a second part 12 which cover each other to define a sealed space 13 for accommodating the battery cell 20. The first part 11 may be made into a hollow structure with one side open, the second part 12 may also be made into a hollow structure with one end open, and a side of the second part 12 with an open covers a side of the first part 11 with an open to form a box 10 with a sealed space 13.

In FIG. 2, the second part 12, known as an upper box, is located on the upper side of the first part 11 which may also be called as a lower box.

In the battery 100, the number of the battery cell 20 (not shown in FIG. 2) may be one or more. If a plurality of battery cells 20 are provided, the plurality of battery cells 20 can be connected in series, parallel or combination thereof which means that the plurality of battery cells 20 are connected in both series and parallel. The plurality of battery cells 20 can be directly connected in series, parallel or any combination thereof, and then the whole formed by the plurality of battery cells 20 is accommodated in the box 10. Certainly, it is also possible that the plurality of battery cells 20 are connected in series, parallel or combination thereof to form a battery module 30, and then a plurality of battery modules 30 are connected in series, parallel or combination thereof to form a whole, which is then contained in the box 10. The battery cell 20 may be a cylinder, a flat body, a cuboid or the like.

Figures 3, 4:
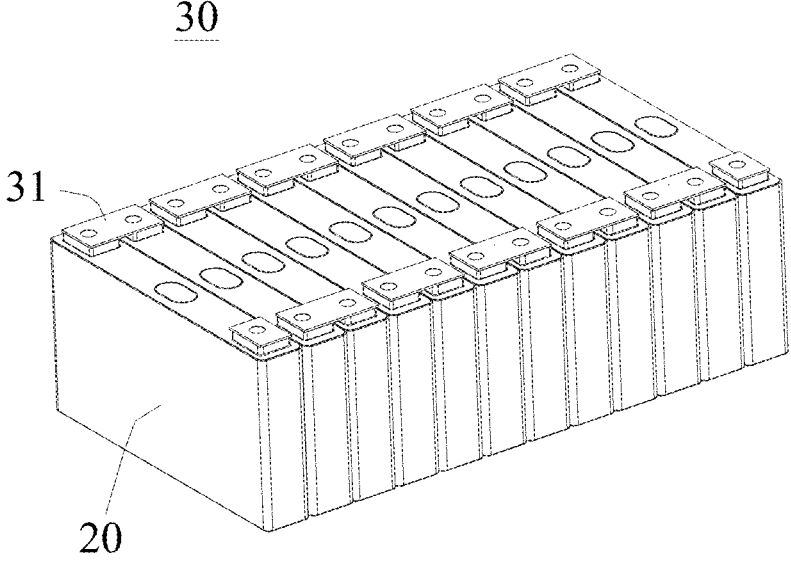
FIG. 3 is a schematic structural diagram of the battery module shown in FIG. 2.
FIG. 4 is an exploded view of a battery cell provided in some embodiments of the application.

In some embodiments, referring to FIG. 3, a plurality of battery cells 20 are provided and connected in series, parallel or combination thereof to form a battery module 30, and then a plurality of battery modules 30 are connected in series, parallel or combination thereof to form a whole, which is contained in the box 10.

In some embodiments, the battery 100 may further include a bus component 31, through which the plurality of battery cells 20 may be electrically connected to achieve series connection, parallel connection or parallel-series connection of the plurality of battery cells 20. Taking the series connection of two battery cells 20 as an example, the positive electrode terminal of one battery cell 20 is connected to the negative electrode terminal 235 of the other battery cell 20 through the bus component 31 to achieve the series connection of the two battery cells 20.

Referring to FIG. 4, the battery cell 20 may include a case 21, an electrode assembly 22 and an end cover assembly 23, the case 21 has an opening 211, the electrode assembly 22 is accommodated in the case 21, the end cover assembly 23 includes a cover plate 231 and an electrode terminal 235, the cover plate 231 is used to cover at the opening 211, the electrode terminal 235 is used to be electrically connected with the electrode assembly 22.

The case 21 may also be made of various materials such as copper, iron, aluminum, stainless steel and aluminum alloy, which is not particularly limited in embodiments of the application.

The case 21 may be made into various shapes such as a cylinder or a cuboid, depending on the specific shape of the electrode assembly 22. For example, if the electrode assembly 22 has a cylinder structure, the case 21 may be selected as a cylinder structure; if the electrode assembly 22 has a cuboid structure, the case 21 may be selected as a cuboid structure. Exemplarily, both the case 21 and the electrode assembly 22 are cuboid structures in FIG. 4.

The electrode assembly 22 may include a positive pole piece, a negative pole piece, and a separator film. In some embodiments, the electrode assembly 22 may be a winding structure formed by winding a positive pole piece, a separator film, and a negative pole piece. In some other embodiments, the electrode assembly 22 may also be a laminated structure formed through laminated arrangement of a positive pole piece, a separator film and a negative pole piece.

In some embodiments, the electrode assembly 22 may also include a positive tab (not shown) and a negative tab (not shown), wherein the positive tab may be a positive current collector not coated with a positive active material layer in the positive pole piece, and the negative tab may be a negative current collector not coated with a negative active material layer in the negative pole piece.

Figures 5, 6:
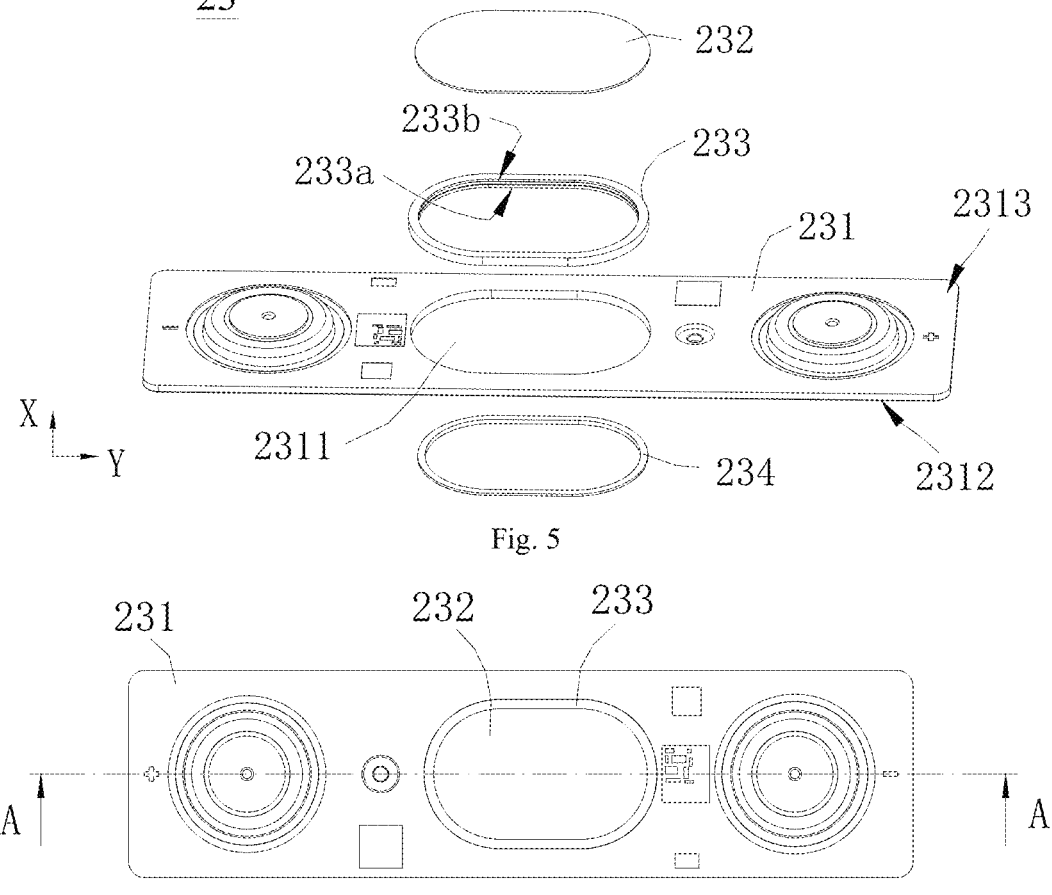
FIG. 5 is a schematic structural diagram of an end cover assembly provided in some embodiments of the application.
FIG. 6 is a top view of an end cover assembly provided in some embodiments of the application.
Figure 7:
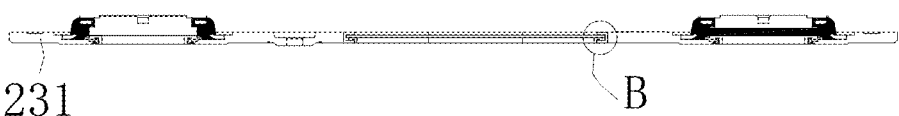
FIG. 7 is a cutaway view along A-A direction in FIG. 6.

In an embodiment of the application, the cover plate 231 of the end cover assembly 23 is used for covering the opening 211 of the case 21 to form a sealed space (not shown) for accommodating the battery cell 20. The sealed space is also used to contain electrolyte, such as liquid type electrolyte. The electrode terminal 235 of the end cover assembly 23 serves as a component for outputting electric energy of the electrode assembly 22, and is electrically connected to the electrode assembly 22, that is, the electrode terminal 235 is electrically connected to a tab of the electrode assembly 22, for example, the electrode terminal 235 is connected to the tab through a switching piece (see FIG. 6) to achieve the electrical connection between the electrode terminal 235 and the tab.

It should be noted that the number of the opening 211 on the case 21 may be one or two.

In some embodiments, as shown in FIG. 4, the number of the opening 211 on the case 21 may be one, and the number of the end cover assembly 23 may be also one, the end cover assembly 23 may be provided with two electrode terminals 235 which are positive electrode terminals and negative electrode terminals respectively, the positive electrode terminal and the negative electrode terminal are electrically connected to the positive tab and the negative tab of the electrode assembly 22 respectively. The battery cell 20 with the above structure may be a square-shaped battery cell 20.

In some other embodiments, the number of the opening 211 on the case 21 is two, for example, two openings 211 are arranged on two opposite sides of the case 21; and the number of the end cover assemblies 23 may also be two, and the two end cover assemblies 23 cover and engage with the two openings 211 of the case 21 respectively. In this case, the electrode terminal 235 in one end cover assembly 23 may be defined as a positive electrode terminal which is configured to be electrically connected to the positive tab of the electrode assembly 22; and the electrode terminal 235 in the other end cover assembly 23 may be defined as a negative electrode terminal which is configured to be electrically connected to the negative pole piece 222 of the electrode assembly 22. The battery cell 20 with the above structure may be a cylindrical battery cell 20.

The specific structure of the end cover assembly 23 will be described in detail with reference to the attached drawings.

Referring to FIGS. 5 to 9, the end cover assembly 23 includes a cover plate 231, a breathable film 232 and a fixing member 233, the cover plate 231 is drilled to provide a pressure relief hole 2311, the pressure relief hole 2311 penetrates the cover plate 231 in a thickness direction X of the cover plate 231. The breathable film 232 is disposed opposite to the pressure relief hole 2311, the breathable film 232 is configured to exhaust gas inside the battery cell 20, a projection of breathable film 232 in the thickness direction X doesn't overlap with a projection of cover plate 231 in the thickness direction X, the fixing member 233 is configured to connect the cover plate 231 so as to fix the breathable film 232.

For the end cover assembly 23 provided in an embodiment of the application, the fixing member 233 serves to connect the cover plate 231 and the breathable film 232; since the breathable film 232 is arranged opposite to the pressure relief hole 2311 and a projection of the breathable film 232 on a thickness direction X does not overlap with a projection of the cover plate 231 on the thickness direction X, the breathable film 232 does not completely cover the pressure relief hole 2311, which reduces the radial dimension of the breathable film 232 and the space occupied by the breathable film 232; as a result, the size of the end cover assembly 23 and the battery cell which the end cover assembly is applied to is further reduced.

In the end cover assembly 23, the cover plate 231 is configured to cover the opening 211 of the case 21, which could be a shape of a circle or a rectangle, depending on the shape of the case. For example, a rectangular-shaped cover plate 231 may be used if the case 21 is a cuboid. For another example, a circular cover plate 231 may be used if the case 21 is a cylinder.

The cover plate 231 has a first end face 2312 and a second end face 2313 arranged opposite to each other in a thickness direction X, the first end face 2312 is closer to the electrode assembly compared with the second end face 2313, and the pressure relief hole 2311 penetrates through the first end face 2312 and the second end face 2313.

The pressure relief hole 2311 on the cover plate 231 may be an equal-diameter hole, that is, the radius of the pressure relief hole 2311 does not change in a thickness direction X of the cover plate 231. The pressure relief hole 2311 on the cover plate 231 can also be a variable-diameter hole, for example, a stepped hole. The maximum diameter of the pressure relief hole 2311 is not smaller than the maximum diameter of the breathable film 232, so that a projection of the breathable film 232 in a thickness direction X of the cover plate 231 does not overlap with a projection of the cover plate 231 in the thickness direction X.

The pressure relief hole 2311 may be of a regular shape, such as a circle, an oval or a regular polygon. Certainly, the pressure relief hole 2311 may also be of an irregular shape, such as a polygon with different side lengths or other special shapes.

The breathable film 232 may be cylinder or of other shapes, for example, an oval and an ovaloid, which is not limited by the radial dimension of the breathable film 232, on condition that the breathable film 232 can satisfy the requirement of exhausting gas generated inside the battery cell as well as being connected with cover plate 231 through fixing member 233.

The breathable film 232 is arranged opposite to the pressure relief hole 2311, i.e., the breathable film 232 and the pressure relief hole 2311 are basically aligned in a thickness direction X of the cover plate 231, and the breathable film 232 and the pressure relief hole 2311 can be arranged coaxially or an axis of the breathable film 232 can be arranged parallel to an axis of the pressure relief hole 2311.

In an embodiment of the application, the fixing member 233 serves to connect the breathable film 232 and the cover plate 231, thereby fixing the breathable film 232 with the cover plate 231. The structural form and material of the fixing member 233 are not particularly limited, and the fixing member 233 and the cover plate 231 can be connected by various methods, e.g. fixed connection or detachable connection.

In some optional embodiments, the fixing member 233 is in hermetical connection with the cover plate 231 to ensure the sealing performance of the fixing member 233 and the cover plate 231, so that electrolyte (e.g., liquid type electrolyte) in the battery cell cannot easily leak from the connection position between the fixing member 233 and the cover plate 231.

The hermetical connection between the fixing member 233 and the cover plate 231 can be realized in various ways, for example, by the tight fit between the fixing member 233 and the cover plate 231, or by providing a sealing member between the fixing member 233 and the cover plate 231, or by welding the fixing member 233 with the cover plate 231 together.

In some optional embodiments, an orthogonal projection of the fixing member 233 in a thickness direction X is located in the pressure relief hole 2311, and the fixing member 233 at least partially extends into the pressure relief hole 2311 and is in hermetical connection with the cover plate 231. The fixing member 233 is in match mode with the pressure relief hole 2311 according to the description above, which facilitates the plug-in installation of the fixing member 233, meanwhile meets the connection requirement between the fixing member 233 and the cover plate 231.

In some embodiments, the fixing member 233 is disposed as at least partially being inserted into the pressure relief hole 2311, an aspect of which achieves a positioning of the fixing member 233, and another aspect of which effectively reduces the outer portion of space of the cover plate 231 occupied by the fixing member 233 through rational utilization of the space inside the pressure relief hole 2311.

In some embodiments, along a direction from the second end face 2313 to the first end face 2312 of the cover plate 231, the fixing member 233 may not exceed the first end face 2312 of the cover plate 231. Through this arrangement, the fixing member 233 will not occupy an outer portion of space of the cover plate 231 on a side of the first end face 2312 that is away from the second end face 2313, so as to make more space for other parts in the battery cell and the electrode assembly, and improve the energy density of the battery cell.

As an optional embodiment, the fixing member 233 has a third end face 233*a* and a fourth end face 233*b* arranged opposite to each other in a thickness direction X of the cover plate 231, and the third end face 233*a* is closer to the electrode assembly 22 compared with the fourth end face 233*b*. Optionally, the third end face 233*a* is flush with the first end face 2312, and the fourth end face 233*b* is flush with the second end face 2313.

Based on the fact that the third end face 233*a* is flush with the first end face 2312 and the third end face 233*b* is flush with the second end face 2313, an aspect of which improves the flatness of one side of the fixing member 233 and the cover plate 231 close to the electrode assembly 22, and another aspect of which enables the fixing member 233 to be disposed deeply inserting into the pressure relief hole 2311, which enhances the stability of the fixing member 233.

It should be noted that the third end face 233*a* being flush with the first end face 2312 does not limit the third end face 233*a* to be absolutely flush with the first end face 2312, but tolerates a small distance between the third end face 233*a* and the first end face 2312 within an error range; while the fourth end face 233*b* being flush with the second end face 2313 does not limit the fourth end face 233*b* to be absolutely flush with the second end face 2313 but tolerates a small distance between the fourth end face 233*b* and the second end face 2313 within an error range.

It can be understood that the third end face 233*a* being flush with the first end face 2312 and the fourth end face 233*b* being flush with the second end face 2313 is only an optional embodiment. In some other embodiments, the third end face 233*a* may be disposed beyond the first end face 2312 or between the first end face 2312 and the second end face 2313; optionally, the fourth end face 233 may be disposed beyond the second end face 2313 or between the first end face 2312 and the second end face 2313.

As shown in FIGS. 5 to 9, the specific connection structure of the breathable film 232 and the fixing member 233 will be described in detail. In some optional embodiments, the fixing member 233 clamps the breathable film 232, so that the breathable film 232 is fixed to the fixing member 233. The end cover assembly 23 provided in an embodiment of the application achieves the fixing of the breathable film 232 through the fixing member 233 clamping the fixing member 233, which is structurally simple, and the breathable film 232 cannot be easily detached from the fixing member 233 under the clamping effect of the fixing member 233.

The fixing member 233 can be made into various structures to achieve a fixation of the breathable film 232. The fixing member 233 clamping the breathable film 232 may be a clamping towards a first direction Y (a direction perpendicular to the thickness direction X of the cover plate 231 or a radial direction) of the breathable film 232, or a clamping towards an axial direction (thickness direction X of the cover plate 231) of the breathable film 232.

As an optional embodiment, the fixing member 233 covers the periphery of the breathable film 232 in the circumferential direction, achieving the fixing member 233 clamping the breathable film 232. With the above arrangement, the overall structure of the breathable film 232 fixed by the fixing member 233 becomes more compact. It should be noted that the fixing member 233 covers the periphery of the breathable film 232 in the circumferential direction, wherein the circumferential direction refers to a clockwise or counterclockwise direction in a plane perpendicular to the thickness direction X of the cover plate 231, and the "cover" can refer to full-length covering or partial-length covering. If the fixing member 233 full-lengthily covers the periphery of the breathable film 232 in the circumferential direction, the fixing member 233 may be of a whole ring structure.

Under the condition that the fixing member 233 is at least partially inserted into the pressure relief hole 2311, the fixing member 233 covers the periphery of the breathable film 232 in a circumferential direction, so as to separate an outer side wall of the breathable film 232 from a hole wall of the pressure relief hole 2311, which makes a radial dimension of the breathable film 232 smaller than the radial dimension of the pressure relief hole 2311; accordingly, a projection of the breathable film 232 in a thickness direction X of the cover plate 231 does not overlap with a projection of the cover plate 231 in the thickness direction X.

In some optional embodiments, the fixing member 233 has a through hole 233*c* and a plug-in opening 233*d*, the through hole 233*c* is arranged opposite to the pressure relief hole 2311, and the breathable film 232 covers the through hole 233*c* and at least partially extends into the fixing member 233 through the plug-in opening 233d. The fixing member 233 being provided with a through hole 233c and a plug-in opening 233d facilitates the installation and connection between the breathable film 232 and the fixing member 233, and ensures that a projection of the breathable film 232 in a thickness direction X of the cover plate 231 does not overlap with a projection the cover plate 231 in the thickness direction X.

As an optional embodiment, the end cover assembly provided in an embodiment of the application, the fixing member 233 includes an enclosure 2331, a first limiting part 2332 and a second limiting part 2333, both the first limiting part 2332 and the second limiting part 2333 are arranged on an inner side wall of the enclosure 2331 and disposed along a circumferential direction of the enclosure 2331, the first limiting part 2332 and the second limiting part 2333 are arranged at intervals in a thickness direction X, the enclosure 2331 together with the first limiting part 2332 and the second limiting part 2333 defines an accommodating space 2334 which the breathable film 232 is at least partially located in the accommodating space 2334.

Optionally, the first limiting part 2332 and the second limiting part 2333 are clamp and define the breathable film 232 in a thickness direction X, which can limit the degrees of freedom of the breathable film 232 in the thickness direction X of the cover plate 231, so as to prevent the breathable film 232 from being detached from the fixing member 233 in the thickness direction X, and meet the connection requirement between the breathable film 232 and the fixing member 233.

Optionally, the enclosure 2331 covers and coats the periphery of the fixing member 233, and can radially limit the position of breathable film 232, or, limit the position in a first direction Y. Exemplarily, an outer side wall of the breathable film 232 abuts against an inner side wall of the enclosure 2331, so that the fixing member 233 can clamp the breathable film 232 in the first direction Y (the direction perpendicular to a thickness direction X of the cover plate 231), i.e., the clamping force applied by the enclosure 2331 of the fixing member 233 onto the breathable film 232 is in a first direction of Y of the breathable film 232. The "abut against" herein may be direct abutment, also may be indirect abutment.

Exemplarily, the enclosure 2331 may include a cylindrical structure with two ends open, the first limiting part 2332 and the second limiting part 2333 may be annular structures respectively arranged on an inner side wall of the enclosure 2331.

It should be noted that when the fixing member 233 is at least partially inserted into the pressure relief hole 2311, an outer diameter of the enclosure 2331 can fit with the aperture of the pressure relief hole 2311, so that the enclosure 2331 can be inserted into the pressure relief hole 2311.

Exemplarily, the breathable film 232 may abut against at least one of the first limiting part 2332 and the second limiting part 2333 to achieve an axial (a thickness direction of the cover plate 231) position limitation of the breathable film 232 by the fixing member 233, so as to limit a movement of the breathable film 232 relative to the fixing member 233 along the thickness direction X of the cover plate 231.

Exemplarily, the accommodating space 2334 collectively defined by the enclosure 2331, the first limiting part 2332 and the second limiting part 2333 is an annular space.

In some embodiments, the breathable film 232 includes a body portion 2321 and an edge portion 2322, the body portion 2321 is configured to exhaust gas inside the battery cell 20, the edge portion 2322 is connected to the body portion 2321 and at least partially extends along a first direction Y into the accommodating space 2334, the first direction Y is perpendicular to a thickness direction X. The body portion 2321 is located at the pressure relief hole 2311 and is configured to exhaust gas inside the battery cell 20.

Exemplarily, the body portion 2321 may be a sheet structure, specifically a circular, oval or polygonal structure, and specifically can be arranged according to the structural form of the fixing member 233, as long as the structure can meet the air permeability requirements.

Exemplarily, the edge portion 2322 is located in the accommodating space 2334 and fits with the fixing member 233, and the edge portion 2322 can be arranged surrounding the body portion 2321 as long as the edge portion 2322 fits with the fixing member 233 and realizes a connection between the breathable film 232 and the fixing member 233.

In some optional embodiments, the breathable film 232 may abut against at least one of the first limiting part 2332 and the second limiting part 2333 through the edge portion 2322, so as to limit a movement of the breathable film 232 relative to the connecting member along a thickness direction X. This arrangement may not only meet a connecting requirement with the fixing member 233, but also ensure a gas exhaust inside the battery cell 20.

Figure 8:
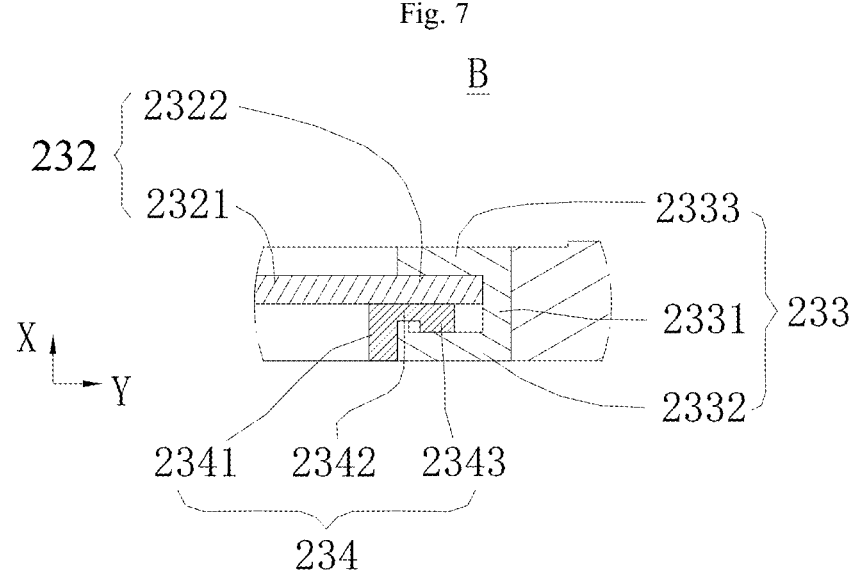
FIG. 8 is an enlarged view at B in FIG. 7.
Figure 9:
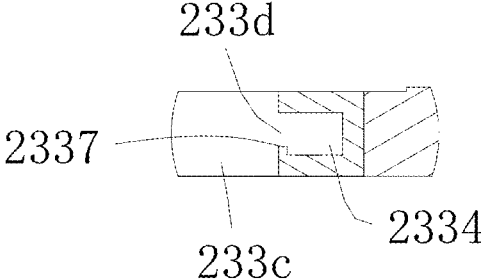
FIG. 9 is a cutaway view of a local structure of an end cover assembly provided in some embodiments of the application.

In some optional embodiments, as shown in FIGS. 8 and 9, the edge portion 2322 is disposed to be stacked and connected with one of the first limiting part 2332 and the second limiting part 2333. The edge portion 2322 being disposed to be stacked and connected with one of the first limiting part 2332 and the second limiting part 2333 can limit a relative position of the edge portion 2322 relative to the first limiting part 2332 or the second limiting part 2333, and limit the degrees of freedom of the edge portion 2322, thereby avoiding a movement of the breathable film 232 relative to the fixing member 233 and ensuring a reliable connection between the breathable film 232 and the fixing member 233.

Exemplarily, the edge portion 2322 may be connected to the first limiting part 2332;

certainly, in some embodiments, the edge portion 2322 may also be connected to the second limiting part 2333.

Exemplarily, the edge portion 2322 may be fixedly connected to one of the first limiting part 2332 and the second limiting part 2333; certainly, in some embodiments, the edge portion 2322 may also be detachably connected to one of the first limiting part 2332 and the second limiting part 2333.

As an optional embodiment, an embodiment of the present application provides an end cover assembly 23, the breathable film 232 is integrally formed with one of the first limiting part 2332 and the second limiting part 2333.

Exemplarily, the breathable film 232 may be integrally formed with the fixing member 233 as a whole by injection molding, neither of which can be detached.

When the edge portion 2322 is integrally formed with one of the first limiting part 2332 and the second limiting part 2333, the edge portion 2322 can be made into an annular sheet structure and arranged surrounding the body portion 2321. Exemplarily, the edge portion 2322 may be formed by extending the body portion 2321 along a radial direction or a first direction Y, and the dimension of the body portion 2321 in the thickness direction X may be the same as the dimension of the edge portion 2322 in the thickness direction X.

Exemplarily, as shown in FIG. 8 and FIG. 9, the first limiting part 2332 can be arranged closer to the case in a thickness direction X compared with the second limiting part 2333; by way of example, the edge portion 2322 is integrally formed with the second limiting part 2333.

It can be understood that it is only an optional embodiment that the edge portion 2322 is integrally formed with one of the first limiting part 2332 and the second limiting part 2333.

Figures 10, 11:
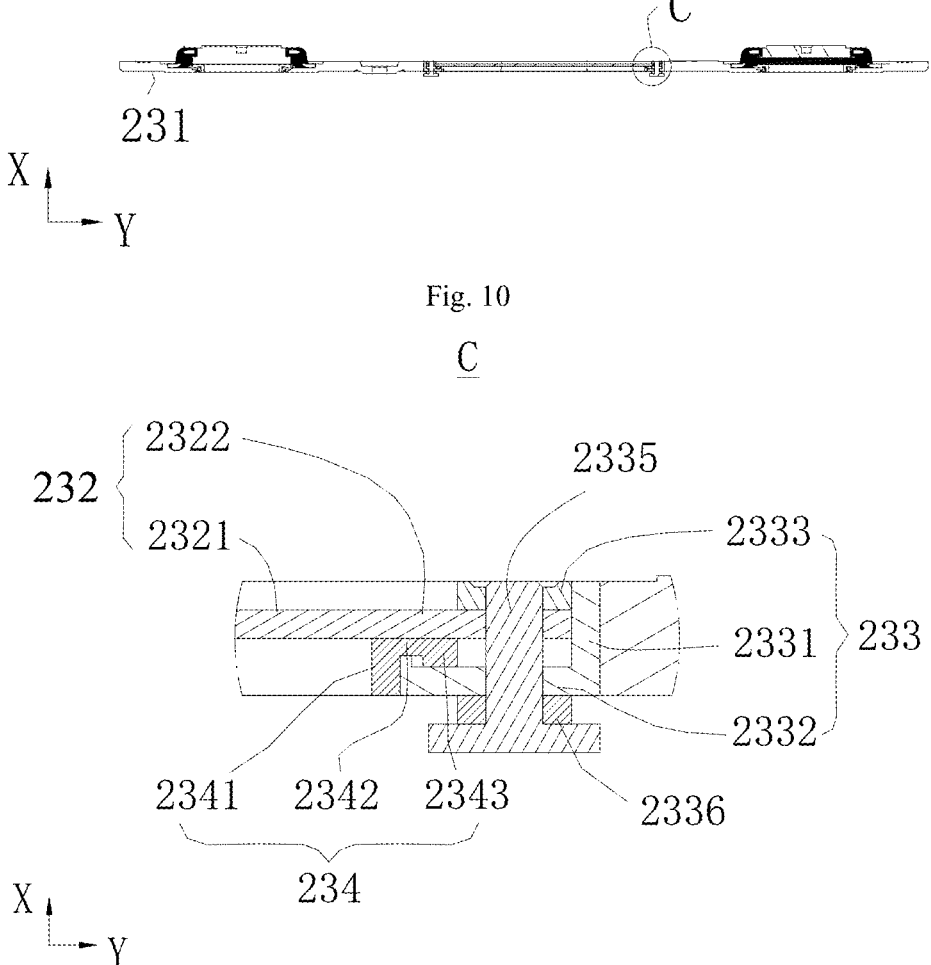
FIG. 10 is a cutaway view of an end cover assembly provided in some embodiments of the application.
FIG. 11 is an enlarged view at C in FIG. 10.

With reference to FIGS. 10 and 11, some other embodiments may arrange one of the first limiting part 2332 and the second limiting part 2333 to be connected with the enclosure 2331 and the other thereof to be abutted against the enclosure 2331, the end cover assembly 23 further includes a connection body 2335 which penetrates and connects with the first limiting part 2332 and the breathable film 232 in a thickness direction X. The above arrangement can also meet a requirement of the edge portion 2322 to be stacked and connected to the first limiting part 2332 and the second limiting part 2333.

Exemplarily, the first limiting part 2332 can be arranged closer to the electrode assembly in a thickness direction X compared with the second limiting part 2333, so that the first limiting part 2332 is connected to the enclosure 2331 and the second limiting part 2333 abuts against the enclosure 2331; the edge portion 2322 and the second limiting part 2333 may be provided with through holes, the connection body 2335 penetrates through the through holes of the end portion 2322 and the second connecting portion, allowing the end portion 2322 at least to be connected to the second limiting part 2333.

In some optional embodiments, the first limiting part 2332, the second limiting part 2333 and the edge portion 2322 may all be provided with through holes at the same time, he connection body 2335 penetrates the through holes of the edge portion 2322, the first limiting portion 2332, the second limiting portion 2333 to be connected with the first limiting portion 2332, the second limiting portion 2333, which also can meet a connecting requirement between the breathable film 232 and the fixing member 233.

As an optional embodiment, the connection body 2335 may be arranged to extend and penetrate the breathable film 232 and the fixing member 233 along a thickness direction X of the cover plate 231. The connection body 2335 may be in the form of rivets, in which case the second limiting part 2333 only abuts against the enclosure 2331 but is not connected thereto; and the connection body 2335 is riveted with the second limiting part 2333. Certainly, it is only an optional embodiment to use rivets for the connection body 2335. In some embodiments, the connection body 2335 may also be in the form of bolts or screws, and the second limiting part 2333 is in threaded connection with the fixing member, in which case the second limiting part 2333 can abut against the enclosure 2331 and be connected thereto, as long as the connecting requirement between the breathable film 232 and the fixing member 233 is met.

As an optional embodiment, when the end cover assembly 23 includes a connection body 2335, a seal ring 2336 may be further arranged between the connection body 2335 and the fixing member 233 to ensure the sealing performance between fixing members 233.

Optionally, the seal ring 2336 is sleeved on the periphery of the connecting member and clamped between the fixing member 233 and connecting members.

It can be understood that the connecting method between the edge portion 2322 of the breathable film 232 and the fixing member 233 is not limited to the above mode.

Figures 12, 13, 14, 15:
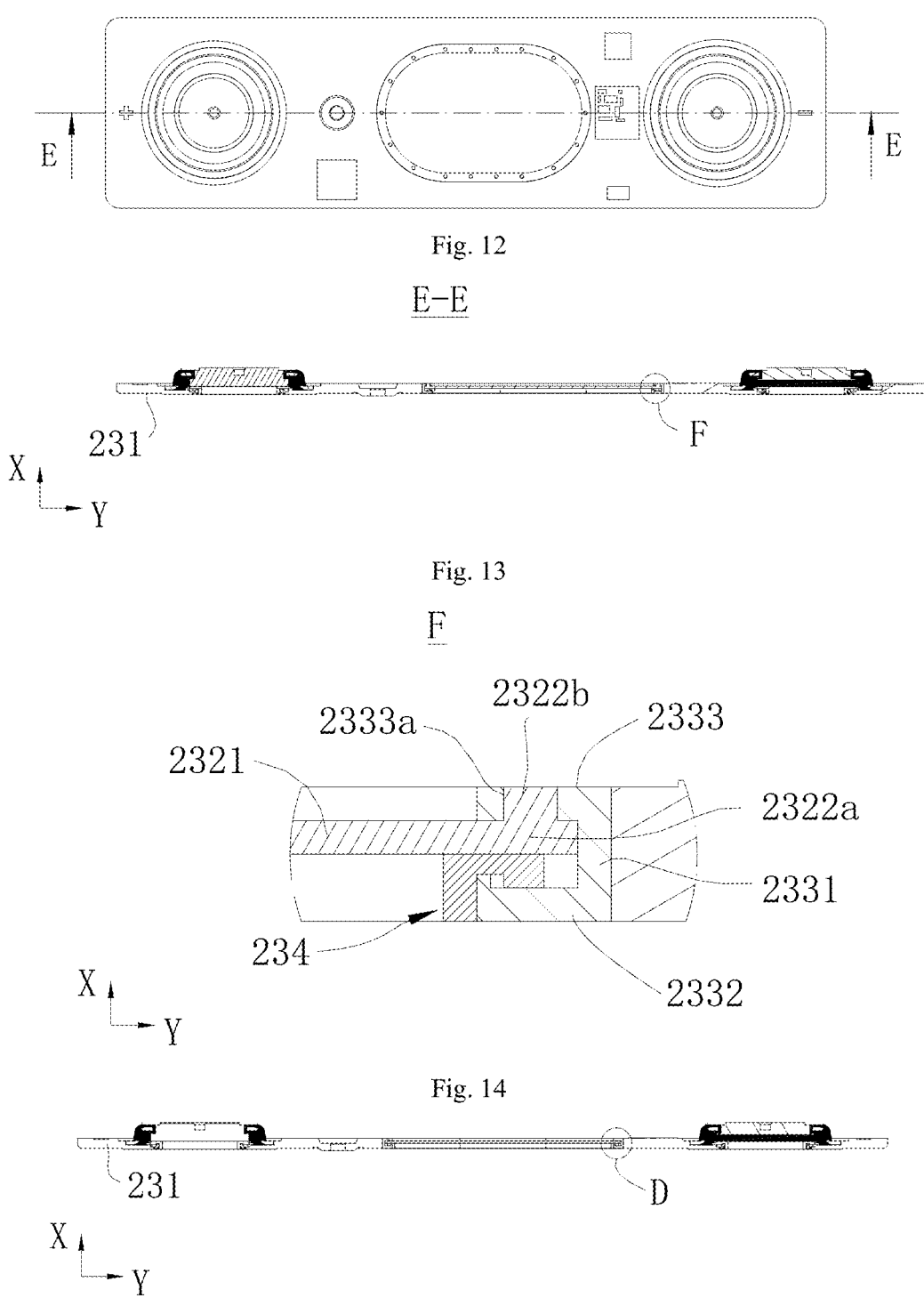
FIG. 12 is a top view of an end cover assembly provided in some embodiments of the application.
FIG. 13 is a cutaway view along the direction E-E in FIG. 12.
FIG. 14 is an enlarged view at F in FIG. 13.
FIG. 15 is a cutaway view of an end cover assembly provided in some embodiments of the application.

Referring to FIGS. 12 and 14, in some embodiments, the edge portion 2322 includes intersecting arranged a first extending body 2322a and a second extending body 2322b, the first extending body 2322a extends along a first direction Y and the second extending body 2322b extends along a thickness direction X, and one of the first limiting part 2332 and the second limiting part 2333 fits with the second extending body 2322b to limit a movement of the breathable film 232 in the first direction Y. Since the degrees of moving freedom of the breathable film 232 in the thickness direction X is limited by at least one of the first limiting part 2332 and the second limiting part 2333, the limitation of the breathable film 232 moving relative to the fixing member 233 in the thickness direction X and in the first direction Y perpendicular to the thickness direction X is achieved, thereby ensuring a reliable connection between the two, and further ensuring a safety performance of the single cell 20.

The second extending body 2322b fits with one of the first limiting part 2332 and the second limiting part 2333 in an intermeshing way, or else in a plugged-in way, as long as the movement of the breathable film 232 can be limited in a first direction Y.

As an optional embodiment, one of the first limiting part 2332 and the second limiting part 2333 is provided with a limiting hole 2333a which penetrates through one of the first limiting part 2332 and the second limiting part 2333 along a thickness direction X; the first extending body 2322a abuts against one of the first limiting part 2332 and the second limiting part 2333, and the second extending body 2322b at least partially extends into the limiting hole 2333a.

The first extending body 2322a abuts against one of the first limiting part 2332 and the second limiting part 2333, and at least partially extends into the limiting hole 2333a to limit the position of breathable film 232 in a thickness direction X and in a first direction Y perpendicular to the thickness direction X, which prevents the breathable film 232 from falling out due to a high temperature or gas impact, as well as avoids a movement of the breathable film 232 relative to the fixing member 233, ensures a reliable connection between the two, and reduces an injection melt flow resistance of the breathable film 232.

Exemplarily, the first extending body 2322a may be formed by extending the body portion 2321 along a circumferential direction, and the second extending body 2322b may be arranged on one surface of the first extending body 2322a in a thickness direction X and protruding from the first extending body 2322a by a certain height in the thickness direction X, the second extending body 2322b may be a whole ring structure arranged surrounding the body portion 2321. Certainly, in some embodiments, the second extending body 2322b may further include a plurality of bulges provided surrounding the body portion 2321.

In some optional embodiments, a dimension of the second extending body 2322b extending in a thickness direction X may be the same as a dimension of the limiting hole 2333a in the thickness direction X. Certainly, in some examples, the dimension of the second extending body 2322b extending in the thickness direction X may be smaller or larger than the dimension of the limiting hole 2333a in the thickness direction X, as long as the fitting requirements between the two can be met.

When one of the first limiting part 2332 and the second limiting part 2333 is provided with a limiting hole 2333a and the second extending body 2322b at least partially extends into the limiting hole 2333a, both the first limiting part 2332 and the second limiting part 2333 can be connected to the enclosure 2331.

It can be understood that the above fitting of the breathable film 232 with the fixing member 233 is only an optional embodiment.

Figure 16:
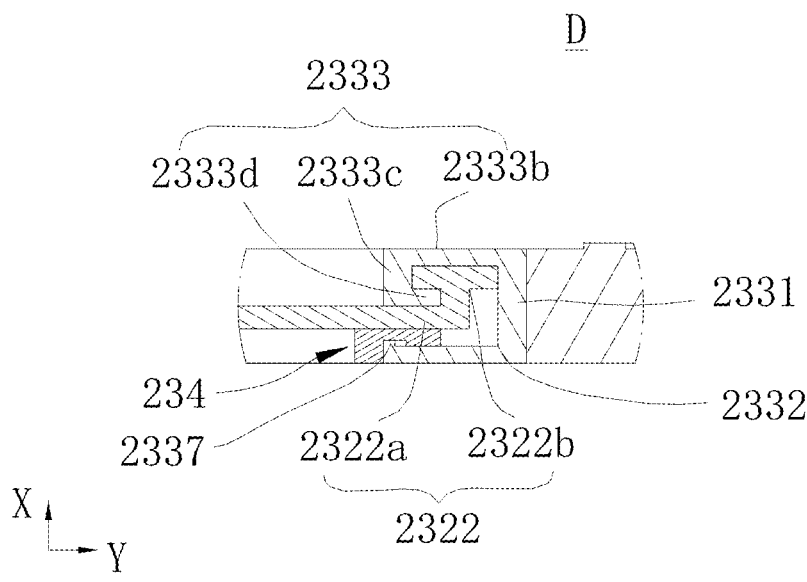
FIG. 16 is an enlarged view at D in FIG. 15.

As shown in FIG. 15 and FIG. 16, in some other examples, one of the first limiting part 2332 and the second limiting part 2333 may further include intersecting disposed a first mating body 2333*b* and a second mating body 2333*c*, the first mating body 2333*b* is arranged apart from the other of the first limiting part 2332 and the second limiting part 2333 in a thickness direction X and connected to the enclosure 2331, a second mating body 2333*c* is connected with an end of the first mating 2333*b* away from the enclosure 2331 and at least partially extends along the thickness direction X, the first mating body 2333*b* abuts against the breathable film 232 in the thickness direction X, and the breathable film 232 is at least partially clamped between the enclosure 2331 and the second mating body 2333*c* in a first direction Y. With the above arrangement, the breathable film 232 can be limited by the first limiting part 2332 and the first mating body 2333*b* in the thickness direction X, and by the enclosure 2331 and the second mating body 2333*c* in the first direction Y intersecting with the thickness direction X, so as to limit a relative position between the breathable film 232 and the fixing member 233 and ensure a reliable connection between the two.

Exemplarily, the first mating body 2333*b* may be an annular sheet structure arranged apart from and opposite to the other one of the first limiting part 2332 and the second limiting part 2333 in a thickness direction X, and the second mating body 2333*c* may be arranged at one end of the first mating body 2333*b* away from the enclosure 2331 in the first direction Y.

In some optional embodiments, for the end cover assembly 23 provided in an embodiment of the application, the second extending body 2322*b* is a structure with a variable section in a thickness direction X, one of the first limiting part 2332 and the second limiting part 2333 may further include a third mating body 2333*d*, the third mating body 2333*d* is connected to the second mating body 2333*c* and extending along a first direction Y to the side where the enclosure 2331 is located, the second extending body 2322*b* is at least partially clamped between the first mating body 2333*b* and the third mating body 2333*d* in the thickness direction X. Through providing the third mating body 2333*d* and clamping at least part of the second extending body 2322*b* between the first mating body 2333*b* and the third mating body 2333*d*, a position of the breathable film 232 can be further limited in the thickness direction X, so as to prevent the breathable film 232 falling out due to high temperature or gas shock, and ensure the safety performance of the end cover assembly 23.

As an optional embodiment, the end cover assembly 23 provided in embodiments of the present application mentioned above, thereof a breathable film 232 may further be utilized as actuating to release an internal pressure of the battery cell 20 when the internal pressure or temperature reaches a threshold value. With the above arrangement, the breathable film 232 can also serve as a safety valve to ensure the safety performance of the breathable film 232.

In some optional embodiments, a strength of the cover plate 231 is greater than a strength of the breathable film 232, so that the breathable film 232 ruptures prior to the cover plate 231 when an internal pressure or temperature of the battery cell 20 reaches a threshold value, thereby releasing the internal pressure of the battery cell 20 and improving the safety performance of the cover plate assembly 231.

As an optional embodiment, the end cover assembly 23 provided in an embodiment of the present application, thereof the breathable film 232 includes polymer materials which have air permeability and water proof, thus allowing gas generated inside the battery cell to be stably discharged by the breathable film 232 and preventing external moisture from infiltrating.

Exemplarily, the polymer material can be selected from FEP (fluorinated ethylene propylene copolymer), PCTFE (polychlorotrifluoroethylene).

As shown in FIGS. 5 to 16, optionally, the end cover assembly 23 provided in embodiments of the application further includes a sealing member 234 for sealing a connection region between the fixing member 233 and the breathable film 232. Through providing the sealing member 234, the sealing performance of the breathable film 232 and the fixing member 233 can be ensured, and pollutants such as water vapor can be prevented from entering through the gap between the breathable film 232 and the fixing member 233; therefore, the safety of the battery cell is ensured.

In some optional embodiments, the sealing member 234 and the breathable film 232 are stacked in a thickness direction X, and the sealing member 234 is clamped and fixed between the fixing member 233 and the breathable film 232. With the above arrangement, the contact area between the sealing member 234 and the breathable film 232 can be increased, and the stability of the relative position of the sealing member 234, the breathable film 232 and the fixing member 233 can be ensured, thereby ensuring the reliability of sealing.

In some optional embodiments, the sealing member 234 includes intersecting disposed a first sealing portion 2341 and a second sealing portion 2342, the first sealing portion 2341 is arranged on an inner side wall of the fixing member 233 along a circumferential direction, and the second sealing portion 2342 extends into the fixing member 233 in a first direction Y perpendicular to the thickness direction X, and abuts against the fixing member 233 and the breathable film 232. With the above arrangement, the sealing member 234 can provide seal in the thickness direction X and the first direction Y, thus ensuring the reliability of sealing.

Exemplarily, the first sealing portion 2341 may be located inside the fixing member 233 and have an annular structure, and the second sealing portion 2342 may be clamped between the fixing member 233 and the breathable film 232 in a thickness direction X.

In some optional embodiments, the sealing member 234 further includes a third sealing portion 2343 which is spaced apart from the first sealing portion 2341 in a first direction Y and arranged opposite to two ends of the second sealing portion 2342, the fixing member 233 further includes a buckling body 2337 extending along a thickness direction X and laminated with the third sealing portion 2343 in the first direction Y, and the first sealing portion 2341 is located between the buckling body 2337 and the enclosure 2331. Through arranging the buckling body 2337 and the third sealing portion 2343, a position limitation of the sealing member 234 in the first direction Y can be achieved, so as to ensure a stable fitting performance of the sealing member 234, the breathable film 232 and the fixing member 233.

Figure 17:
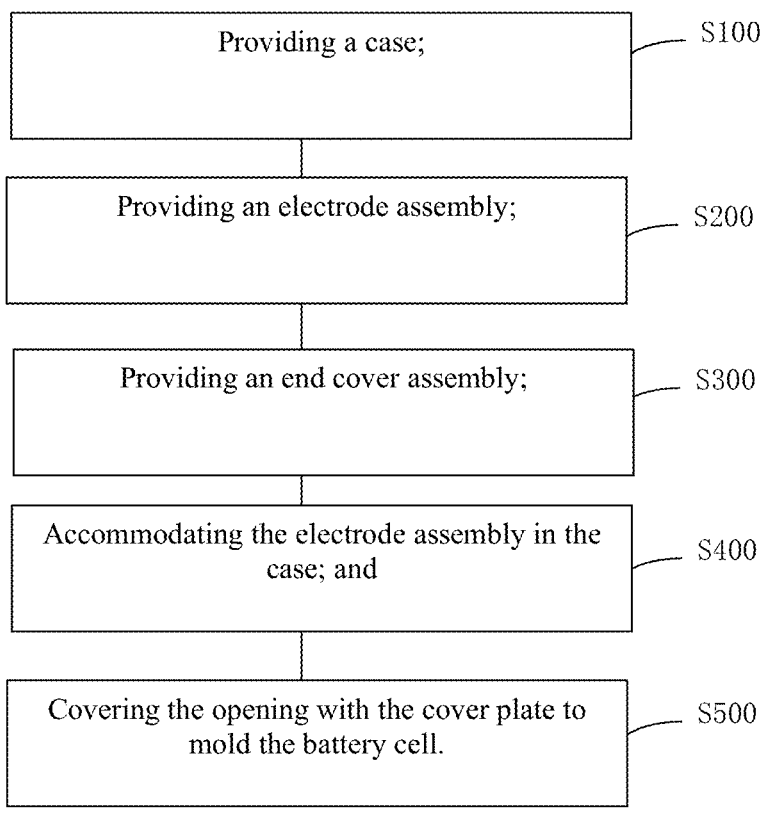
FIG. 17 is a flowchart of the method for manufacturing a battery cell provided in some embodiments of the application.

As shown in FIG. 17, in another aspect, an embodiment of the application provides a method for manufacturing a battery cell, including:

S100. providing a case 21, which has an opening 211;

S200. providing an electrode assembly 22;

S300. providing an end cover assembly 23, which includes a cover plate 231, a breathable plate 232 and a fixing member 233, the cover plate 231 is provided with a pressure relief hole 2311 penetrating through the cover plate 231 in a thickness direction X, the breathable film 232 is arranged opposite to the pressure relief hole 2311, a projection of the breathable film 232 in the thickness direction X does not overlap with a projection of the cover plate 231 in the thickness direction, X, the fixing member 233 is configured to connect the cover plate 231 to fix the breathable film 232;

S400. accommodating the electrode assembly 22 in the case 21; and

S500. covering the opening 211 with the cover plate 231 to form the battery cell 20, wherein the breathable film 232 is configured to exhaust gas inside the battery cell 20.

In the above method, the sequence of step S100, step S200 and step S300 is not limited; for example, step S300 may be executed first, followed by step S200 and step S100.

The related structure of the battery cell 20 manufactured by the above method can refer to the battery cell 20 provided in the above embodiments, and the electrode assembly 22 in the battery cell 20 can refer to the electrode assembly 22 provided in the above embodiments.

Figure 18:
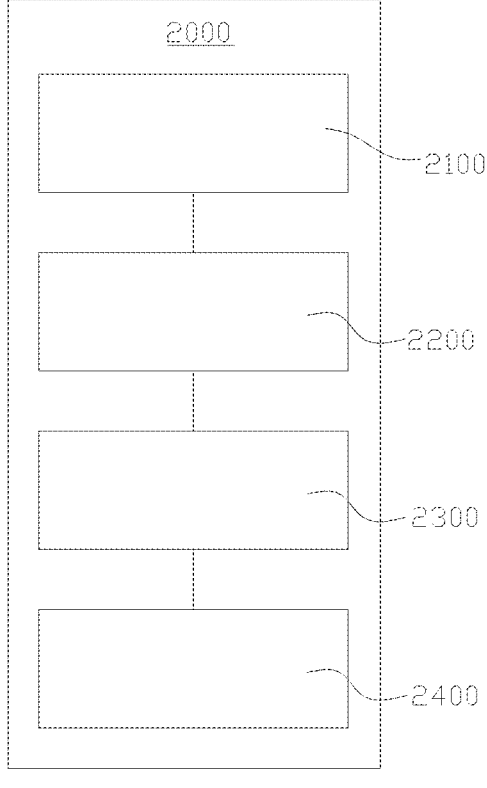
FIG. 18 is a schematic block diagram of a device for manufacturing a battery cell provided in some embodiments of the application.

As shown in FIG. 18, in yet another aspect, an embodiment of the application further provides a device 2000 for manufacturing a battery cell, which includes a first proving device 2100, a second providing device 2200, a third providing device 2300. The first providing device 2100 is configured to provide a case 21, which has an inner cavity and an opening 211; the second providing device 2200 is configured to provide an electrode assembly 22; and the third providing device 2300 is configured to provide an end cover assembly 23. The provided end cover assembly 23 includes: a cover plate 231, a breathable film 232 and a fixing member 233, the cover plate 231 is provided with a pressure relief hole 2311 penetrating through the cover plate 231 in a thickness direction X. The breathable film 232 is arranged opposite to the pressure relief hole 2311, a projection of the breathable film 232 in the thickness direction X does not overlap with a projection of the cover plate 231 in the thickness direction X. The fixing member 233 is configured to connect the cover plate 231 to fix the breathable film 232. The assembly device 2400 is configured to accommodate the electrode assembly 22 in the case 21 and cover the opening 211 with the cover plate 231, wherein the breathable film 232 is configured to exhaust gas inside the battery cell 20.

The related structure of the battery cell 20 manufactured by the above manufacturing equipment 2000 can refer to the battery cell 20 provided in the above embodiments, and the electrode assembly 22 in the battery cell 20 can refer to the electrode assembly provided in the above embodiments.

While the application has been described with reference to optimal embodiments, various modifications may be made thereto and equivalents may be substituted for components thereof without departing from the scope of the application. In particular, the various technical features mentioned in the various embodiments may be combined in any way as long as no structural conflict exists. The application is not limited to the particular embodiments disclosed herein, but includes all technical solutions falling within the scope of the claims.

What is claimed is:

1. An end cover assembly for a battery cell, comprising:
a cover plate, provided with a pressure relief hole penetrating through the cover plate in a thickness direction;
a breathable film, arranged opposite to the pressure relief hole and configured to exhaust gas inside the battery cell, a projection of the breathable film in the thickness direction does not overlap with a projection of the cover plate in the thickness direction;

a fixing member, configured to connect the cover plate to fix the breathable film; and
a sealing member for sealing a connection region between the fixing member and the breathable film, the sealing member includes a first sealing portion, a second sealing portion, and a third sealing portion, wherein
the fixing member includes an enclosure, a first limiting part, and a second limiting part, the second limiting part having a second limiting surface extending in a plane including a second end face surface of a second end face of the cover plate,
the first limiting part includes a protrusion extending from the first limiting part in the thickness direction and spaced away from the enclosure,
the protrusion contacts the first sealing portion and the second sealing portion, and
the protrusion and the third sealing portion are separated by a gap.

2. The end cover assembly according to claim 1, wherein the fixing member clamps the breathable film, so that the breathable film is fixed to the fixing member.

3. The end cover assembly according to claim 2, wherein the fixing member covers a periphery of the breathable film in a circumferential direction, allowing the fixing member to clamp the breathable film.

4. The end cover assembly according to claim 3, wherein the fixing member has a through hole and a plug-in opening, the through hole is arranged opposite to the pressure relief hole, and the breathable film covers the through hole and at least partially extends into the fixing member through plug-in opening.

5. The end cover assembly according to claim 1, wherein the fixing member comprises the enclosure, the first limiting part and the second limiting part, the first limiting part and the second limiting part are both arranged on an inner side wall of the enclosure along a circumferential direction of the enclosure, the first limiting part and the second limiting part are arranged at intervals in the thickness direction, the enclosure, the first limiting part and the second limiting part jointly define an accommodating space, wherein the breathable film is at least partially located in the accommodating space.

6. The end cover assembly according to claim 5, wherein the breathable film comprises a body portion and an edge portion, the body portion is configured to exhaust gas inside the battery cell, the edge portion is connected to the body portion and at least partially extends into the accommodating space along a first direction which is perpendicular to the thickness direction.

7. The end cover assembly according to claim 6, wherein the edge portion abuts against at least one of the first limiting part and the second limiting part to prevent the breathable film from moving relative to the fixing member along the thickness direction.

8. The end cover assembly according to claim 7, wherein the edge portion is laminated and connected with one of the first limiting part and the second limiting part.

9. The end cover assembly according to claim 8, wherein the breathable film is integrally formed with one of the first limiting part and the second limiting part.

10. The end cover assembly according to claim 7, wherein one of the first limiting part and the second limiting part is connected to the enclosure and the other one of the first limiting part and the second limiting part abuts against the enclosure, the end cover assembly further comprises a connection body which penetrates and connects with the first limiting part and the breathable film in the thickness direction.

11. The end cover assembly according to claim 7, wherein the edge portion comprises a first extending body and a second extending body, the first extending body extends along the first direction and the second extending body extends along the thickness direction, and one of the first limiting part and the second limiting part fits with the second extending body to limit a movement of the breathable film in the first direction.

12. The end cover assembly according to claim 11, wherein one of the first limiting part and the second limiting part is provided with a limiting hole which penetrates through one of the first limiting part and the second limiting part along the thickness direction; the first extending body abuts against one of the first limiting part and the second limiting part, and the second extending body at least partially extends into the limiting hole.

13. The end cover assembly according to claim 11, wherein one of the first limiting part and the second limiting part comprises a first mating body and a second mating body, the first mating body is arranged with an interval from the other of the first limiting part and the second limiting part in the thickness direction and connected to the enclosure, the second mating body is connected to one end of the first mating body away from the enclosure and at least partially extends along the thickness direction, the first mating body abuts against the breathable film in the thickness direction, and the breathable film is at least partially clamped between the enclosure and the second mating body in the first direction.

14. The end cover assembly according to claim 13, wherein the second extending body is a structure with a variable section in the thickness direction, one of the first limiting part and the second limiting part further comprises a third mating body connected to the second mating body and extending along the first direction towards the enclosure, and the second extending body is at least partially clamped between the first mating body and the third mating body in the thickness direction.

15. The end cover assembly according to claim 1, wherein an orthogonal projection of the fixing member in the thickness direction is located in the pressure relief hole, and the fixing member at least partially extends into the pressure relief hole and is in sealed connection with the cover plate.

16. The end cover assembly according to claim 15, wherein the cover plate has a first end face and the second end face arranged opposite to each other in the thickness direction, and the fixing member does not exceed at least one of the first end face and the second end face in the thickness direction.

17. The end cover assembly according to claim 1, wherein the sealing member and the breathable film are stacked in the thickness direction, and the sealing member is clamped and fixed between the fixing member and the breathable film.

18. The end cover assembly according to claim 1, wherein the breathable film is further actuated to release an internal pressure of the battery cell when the internal pressure or temperature of the battery cell reaches a threshold value, a strength of the cover plate is greater than a strength of the breathable film, so that the breathable film ruptures prior to the cover plate when the internal pressure or temperature of the battery cell reaches a threshold value, so as to release the internal pressure of the battery cell, the breathable film further comprises a polymer material.

19. A battery cell, comprising:
a case, which has an opening;
an electrode assembly accommodated in the case; and
the end cover assembly according to claim 1, the cover plate being configured to cover the opening, and the breathable film being configured to exhaust gas inside the battery cell.

20. A method for manufacturing a battery cell, comprising:
providing a case, which has an opening;
providing an electrode assembly;
providing an end cover assembly, comprising:
a cover plate, provided with a pressure relief hole penetrating through the cover plate in a thickness direction;
a breathable film, arranged opposite to the pressure relief hole, a projection of the breathable film in the thickness direction does not overlap with a projection of the cover plate in the thickness direction;
a fixing member, configured to connect the cover plate to fix the breathable film;
accommodating the electrode assembly in the case; and
a sealing member for sealing a connection region between the fixing member and the breathable film, the sealing member includes a first sealing portion, a second sealing portion, and a third sealing portion; and
sealing the opening with the cover plate to form the battery cell; wherein:
the breathable film is configured to exhaust gas inside the battery cell,
the fixing member includes an enclosure, a first limiting part, and a second limiting part, the second limiting part having a second limiting surface extending in a plane including a second end face surface of a second end face of the cover plate,
the first limiting part includes a protrusion extending from the first limiting part in the thickness direction and spaced away from the enclosure,
the protrusion contacts the first sealing portion and the second sealing portion, and
the protrusion and the third sealing portion are separated by a gap.

21. The end cover assembly for the battery cell according to claim 1, wherein:
the cover plate including a first end face,
the fixing member including the first limiting part, and
the sealing member includes the first sealing portion arranged on an inner side wall of the first limiting part, and the first sealing portion having a lower surface extending in a plane including a first limiting part surface of the first limiting part and a first end face surface of the first end face.

\*　\*　\*　\*　\*